United States Patent
Beitelspacher et al.

(10) Patent No.: US 10,365,359 B2
(45) Date of Patent: Jul. 30, 2019

(54) AMBIGUOUS RADAR RANGE RESOLUTION USING RANGE LOOKUP TABLE

(71) Applicant: RAYTHEON COMPANY, Waltham, MA (US)

(72) Inventors: Justin R. Beitelspacher, Wylie, TX (US); Carlos A. Martinez, Mckinney, TX (US)

(73) Assignee: RAYTHEON COMPANY, Waltham, MA (US)

( * ) Notice: Subject to any disclaimer, the term of this patent is extended or adjusted under 35 U.S.C. 154(b) by 562 days.

(21) Appl. No.: 15/148,157

(22) Filed: May 6, 2016

(65) Prior Publication Data

US 2017/0322298 A1   Nov. 9, 2017

(51) Int. Cl.
*G01S 13/22*   (2006.01)

(52) U.S. Cl.
CPC ................... *G01S 13/22* (2013.01)

(58) Field of Classification Search
CPC ........ G01S 13/22; G01S 13/08; G01S 13/106; G01S 13/12; G01S 13/20; G01S 13/225; G01S 13/227
See application file for complete search history.

(56) References Cited

U.S. PATENT DOCUMENTS

| | | | |
|---|---|---|---|
| 4,057,800 A * | 11/1977 | Ganz | G01S 13/227 342/116 |
| 4,106,019 A | 8/1978 | Alexander et al. | |
| 4,714,927 A * | 12/1987 | Siegel | G01S 13/225 342/160 |
| 4,816,833 A * | 3/1989 | Ferguson | G01S 13/20 342/108 |
| 4,954,830 A | 9/1990 | Krikorian et al. | |
| 5,247,303 A * | 9/1993 | Cornelius | G01S 13/20 342/26 D |

(Continued)

OTHER PUBLICATIONS

Zhou, Run et al.; "Analysis and Simulation for Ambiguity Resolving Using Residues' Difference Lookup Table"; Systems Engineering and Electronics; vol. 24, No. 5, May 2002, Chinese Language with English Abstract (3 pgs.).

(Continued)

*Primary Examiner* — Bernarr E Gregory
*Assistant Examiner* — Daniel P Malley, Sr.
(74) *Attorney, Agent, or Firm* — Lewis Roca Rothgerber Christie LLP

(57) ABSTRACT

System and method for determining range to targets using an M-of-N range resolver includes transmitting multiple coherent processing interval (CPI) signals with different pulse repetition frequencies (PRFs) towards the targets, receiving and storing threshold hits from prior N−1 CPIs; converting the threshold hits from the current CPI and prior N−1 CPIs to range unfolded threshold hits; generating a lookup table of the plurality of range unfolded threshold hits from the prior N−1 CPIs; determining the number of the prior N−1 CPIs in which a range unfolded threshold hit from the current CPI has at least one range coincident range unfolded threshold hit from a prior CPI utilizing the lookup table; generating a range resolved threshold hit when the number is greater than or equal to M−1; accumulating range resolved threshold hits; and determining the range to the targets.

14 Claims, 11 Drawing Sheets

(56) References Cited

U.S. PATENT DOCUMENTS

| | | | | |
|---|---|---|---|---|
| 5,646,623 | A * | 7/1997 | Walters | G01S 13/32 342/112 |
| 5,808,580 | A * | 9/1998 | Andrews, Jr. | G01S 13/582 342/108 |
| 6,543,716 | B1 * | 4/2003 | Miller | F41F 3/04 244/3.21 |
| 6,549,158 | B1 * | 4/2003 | Hanson | F41G 7/2206 342/13 |
| 6,561,074 | B1 * | 5/2003 | Engel | F41F 3/0406 89/1.818 |
| 6,563,450 | B1 * | 5/2003 | Wallace | F41G 7/2206 342/100 |
| 6,568,628 | B1 * | 5/2003 | Curtin | F41G 7/2206 244/3.14 |
| 6,575,400 | B1 * | 6/2003 | Hopkins | F41G 7/2206 244/3.19 |
| 6,603,421 | B1 * | 8/2003 | Schiff | G01S 13/86 342/13 |
| 6,630,902 | B1 * | 10/2003 | Fenton | G01S 13/72 342/100 |
| 6,674,390 | B1 * | 1/2004 | Murphy, Jr. | G01S 13/72 342/13 |
| 6,771,205 | B1 * | 8/2004 | Barton | G01S 13/72 342/13 |
| 9,482,744 | B1 * | 11/2016 | Neary | G01S 13/225 |
| 2004/0021600 | A1 * | 2/2004 | Wittenberg | G01S 13/24 342/190 |
| 2005/0035903 | A1 * | 2/2005 | Bergkvist | G01S 13/20 342/160 |
| 2009/0046001 | A1 | 2/2009 | Beilin et al. | |
| 2016/0195607 | A1 * | 7/2016 | Roulston | G01S 7/025 342/188 |

OTHER PUBLICATIONS

Duan, Jun-qi et al.; "Computationally Efficient Algorithm for Resolving Range and Velocity Ambiguities in Multiple PRF PD Radars"; Journal of University of Electronic Science and Technology of China, vol. 37, No. 4, Jul. 2008, Chinese Language with English Abstract (3 pgs.).

Liu, Zhi-ying; "Ambiguity resolution for PD radar with remainder theorem and one-dimensional set algorithm"; Modern Electronics Technique; vol. 35, No. 9, May 1, 2012, Chinese Language with English Abstract (3 pgs.).

Li, Ming et al.; "A high efficient range ambiguity resolution algorithm for PD radar base on one-dimensional set"; Proc. of SPIE; vol. 8285; Oct. 1, 2011; (5 pgs.).

Ming, "A High Efficient Range Ambiguity Resolution Algorithm for PD Radar Base on One-dimensional Set" International Conference on Graphic and Image Processing (ICGIP 2011), SPIE, vol. 8285, No. 1, Oct. 1, 2011 (pp. 1-5).

Wikipedia Contributors: "Range Ambiguity Resolution", Retrived from the Internet: URL:https://web.archive.org/web/20120928011226/https://en.wikipedia.org/wiki/Range_ambiguity_resolution, Sep. 28, 2012 (4 pgs.).

International Search Report for corresponding International Application No. PCT/US2017/020801, filed Mar. 3, 2017, International Search Report dated Jun. 1, 2017 and dated Jun. 12, 2017 (5 pgs.).

Written Opinion of the International Searching Authority for corresponding International Application No. PCT/US2017/020801, filed Mar. 3, 2017, Written Opinion of the International Searching Authority dated Jun. 12, 2017 (7 pgs.).

* cited by examiner

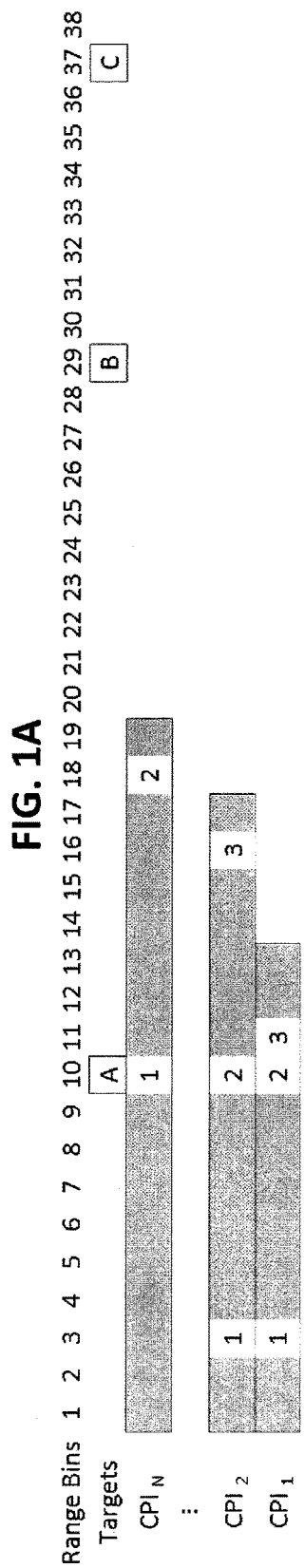

FIG. 2A

| Range Bin | List Lookup Table Memory | |
|---|---|---|
| | CPI Index 1 | CPI Index 2 |
| 1 | none | none |
| 2 | $1_1$ | $1_1$ |
| 3 | $1_1$ | $1_1$ |
| 4 | $1_1$ | $1_1$ |
| 5 | none | none |
| 6 | none | none |
| 7 | none | none |
| 8 | none | none |
| 9 | $2_1$ | $2_1$ |
| 10 | $2_1, 3_1$ | $2_1$ |
| 11 | $2_1, 3_1$ | $2_1, 3_1$ |
| 12 | $3_1$ | $3_1$ |
| 13 | none | $3_1$ |
| 14 | none | none |
| 15 | $1_2$ | none |
| 16 | $1_2$ | none |
| 17 | $1_2$ | none |
| 18 | none | none |
| 19 | none | $1_2$ |
| 20 | none | $1_2$ |
| 21 | none | $1_2$ |
| 22 | $2_2$ | none |
| 23 | $2_2, 3_2$ | none |
| 24 | $2_2, 3_2$ | none |
| 25 | $3_2$ | $2_2$ |
| 26 | none | $2_2$ |
| 27 | $1_3$ | $2_2, 3_2$ |
| 28 | $1_3$ | $3_2$ |
| 29 | $1_3$ | $3_2$ |
| 30 | none | none |
| 31 | none | none |
| 32 | none | none |
| 33 | none | none |
| 34 | none | none |
| 35 | $2_3$ | none |
| 36 | $2_3, 3_3$ | $1_3$ |
| 37 | $2_3, 3_3$ | $1_3$ |
| 38 | $3_3$ | $1_3$ |

FIG. 2B

AMBIGUOUS RADAR RANGE RESOLUTION USING RANGE LOOKUP TABLE

FIELD OF THE INVENTION

The disclosed invention relates generally to radars; and more particularly to ambiguous range and/or frequency resolution for medium and high pulse repetition frequency (PRF) radars.

BACKGROUND

A typical radar system includes a transmitter, a receiver, and an antenna. After producing a brief radio frequency (RF) pulse, the transmitter is turned off for the receiver to sample echoes. In a radar system, a radio signal of a particular carrier frequency is turned on and off at a pulse repetition frequency rate. The reciprocal of the PRF is the pulse repetition interval (PRI). The required PRI of the radio signal is typically a function of the radar's desired range, because the radio signal has to travel out to the target and reflect back from the target to the receiver again. Longer periods are required for longer range signals, requiring lower PRFs. Conversely, higher PRFs produce shorter unambiguous ranges, but could broadcast more pulses in a given amount of time. These are just a few design trades one must take into account when designing a radar system.

A coherent processing interval (CPI) in radar systems indicates a group of multiple pulses, usually with the same PRF and center frequency. A CPI generally includes multiple coherently integrated pulses. PRF and center frequency are sometimes changed between CPIs or groups of CPIs.

A pulse-Doppler radar is a radar system that determines the range to a target using pulse-timing techniques and uses the Doppler effect of the returned signal to determine the target's velocity. However, range and Doppler measurement of targets for medium PRF radars is negatively affected by having ambiguous ranges and range rates. A key requirement for solving range ambiguities is to know the round-trip time of the transmitted signal and the echo received; the range calculations will remain unambiguous as long as the target is detected before the pulse repetition interval ends. However, if the echo of the transmitted signal is received after the following pulse is transmitted, the round-trip time will be off by one or more PRIs.

The difference between the transmitted time and the time the echo is received, or the round-trip time, is then used to calculate the range. However, if the echo is received after the pulse repetition interval ends and the subsequent pulse is transmitted, the target will appear to have the wrong range based on this calculation. Echoes received in this case are often referred to as multiple time around echoes. The range at which a radar return can be received without receiving multiple time around echoes is referred to as the maximum unambiguous range ($R_u$). The maximum unambiguous range can be calculated by the following formula:

$$R_u = \frac{C * PRI}{2} \quad (1)$$

where $R_u$ is the maximum unambiguous range and C is Speed of light.

As shown by the formula, the multiple time around echoes can be eliminated by increasing the PRI long enough to cover the desired range. Using low PRFs would be ideal when trying to cover a long range. However, this is not always feasible during the design of a radar system. At times, PRF switching may be used to resolve range ambiguities in the above-mentioned radar design, which requires the use of multiple PRFs and a resolver algorithm.

A method for solving range ambiguities is therefore required to obtain the target's true range, for instances when the true target's range exceeds $R_u$. In this instance, the raw return signal from an echo will appear to have a range less than the true target range. This apparent range is a modulo operation of the true range and the PRI.

High and mid PRF radars use methods, such as the Chinese Remainder Theorem (CRT), to solve for range ambiguities. CRT uses multiple PRFs to determine the target's true range. This method declares a range resolved threshold hit after detecting a range coincident threshold hit in at least M of N sequential CPIs. It is often referred to as an M-of-N range resolver. A threshold hit is defined as sufficient energy in a radar return signal that is above some noise threshold to indicate a possible echo of the transmitted signal off of a target. The threshold hit has a range determined based on the round trip time of the echo. A threshold hit is declared when a condition within the received data is met. This condition can be a desired magnitude point above a predefined noise level. A threshold hit represents a potential echo off a target. A threshold hit has a range attribute derived from the round trip time of the echo and potentially other attributes as well, potentially including the magnitude of the echo and its range rate. The threshold hit throughput of an M-of-N range resolver for a radar mode is a major limiting factor in the ability of a radar mode to operate in dense target environments. This impacts the design and implementation of radar modes in high and mid PRF radars. Some prior approaches use small scan areas and/or avoid target dense areas, such as major highways or city streets, to reduce the number of targets.

FIG. 1A depicts threshold hits for a threshold processed radar return in a medium or high PRF radar mode with three targets A, B and C. The threshold hits are presented before range unfolding. As shown, the lengths of the returns for each of the CPIs 1 to N are different reflecting different unambiguous ranges due to a different PRF being employed for each CPI. A range bin typically corresponds to the rate at which the signal is sampled. The depicted threshold hits are associated only with range bins for simplicity, but a threshold hit may have many other parameters not captured in this figure. In some embodiments, a threshold hit may also have a Doppler bin allowing multiple threshold hits per range bin during each CPI interval. In this figure the threshold hits for each CPI are depicted with a number, which is the threshold hit index for that CPI. In this example, the threshold hit indexes are ordered based on the range bin of the range unambiguous return, however, the order is arbitrary and can be different from the depicted order. In this example, targets B and C are detected after the PRI ends and their range is ambiguous.

FIG. 1B shows range unfolded threshold hits in a medium or high PRF radar mode with three targets after range unfolding. The range unfolding process identifies the set of possible true ranges for each of the threshold hits. These new hits are referred to as the range unfolded threshold hits. They are depicted with the threshold hit index from FIG. 1A along with a new number in subscript. The number in subscript is the unfolded range index (e.g., $1_1$, $2_1$, $3_1$, etc.). The unfolded range indexes per CPI range from 1 to the number of times the range is unfolded for that CPI to get to the maximum range of the mode. The unfolded range index of a range unfolded threshold hit is the number of PRIs it would take to transmit a pulse and receive an echo from that range for the given CPI. For example, in $CPI_2$, a return from target A would be received within one PRI, a return from target B would be received within 2 PRIs, and a return from target C would be returned within 3 PRIs, as shown.

FIG. 1E illustrates the range resolved threshold hits which would be output if CPIs 1, 2, and N from FIG. 1B were CPIs processed through an M-of-N range resolver where M and N equal 3. Range resolved threshold hits are found at range bins 10, 29, and 37 because range coincident range unfolded threshold hits occurred at these range bins in 3 (M) of 3 (N) sequential CPIs.

FIG. 1C illustrates an exhaustive state space search for range unfolded threshold hits in the prior N−1 CPIs which are range coincident with range unfolded threshold hit $1_1$ from $CPI_N$ in order to identify range resolved threshold hits for an M-of-N range resolver. Such a search must be performed for each of the range unfolded threshold hits in $CPI_N$. Since each hit from $CPI_N$ is compared to each of the hits from the prior N−1 CPIs, the required computation scales quadratically with the number of threshold hits. For example, if the number of range unfolded threshold hits per CPI doubled then the number of arrows in FIG. 1C would double indicating that the computation required to process range unfolded threshold hit $1_1$ from $CPI_N$ had doubled. This doubling in processing would occur for each of the now doubled range unfolded threshold hits in $CPI_N$. The result would be that the total computation quadrupled when the number of threshold hits per CPI was doubled.

Therefore, there is a need to increase the throughput and thus substantially increase the number of targets which can be detected and tracked by a radar system.

SUMMARY

The embodiments of the disclosed invention is to generate and use a range lookup table for each of the prior N−1 CPIs to significantly reduce the computational complexity of the range resolver process.

In some embodiments, the disclosed invention is a method, executed by a radar system, for determining range to targets using an M-of-N range resolver. The method includes: transmitting multiple coherent processing interval (CPI) signals with different pulse repetition frequencies (PRFs) towards the targets; receiving and storing a plurality of threshold hits from prior N−1 CPIs; receiving a plurality of threshold hits from a current CPI; converting a plurality of received threshold hits from the prior N−1 CPIs to range unfolded threshold hits; converting a plurality of received threshold hits from the current CPI to range unfolded threshold hits; generating a lookup table of the plurality of range unfolded threshold hits from the prior N−1 CPIs, based on the CPI of each range unfolded threshold hit and the range of each range unfolded threshold hit; determining the number of the prior N−1 CPIs in which a range unfolded threshold hit from the current CPI has at least one range coincident range unfolded threshold hit from the prior CPI, utilizing the lookup table; generating a range resolved threshold hit when the number of the prior N−1 CPIs in which a range unfolded threshold hit from the current CPI has at least one range coincident range unfolded threshold hit from the prior CPI is greater than or equal to M−1; repeating said determining the number of the prior N−1 CPIs and said generating a range resolved threshold hit for each of the plurality of range unfolded threshold hits from the current CPI; accumulating a plurality of range resolved threshold hits over one or more CPIs; and determining the range to the targets, using the accumulated plurality of range resolved threshold hits over said one or more CPIs.

In some embodiments, the disclosed invention is a radar target detection system including an M-of-N range resolver that includes: a transmitter for transmitting multiple coherent processing interval (CPI) signals with different pulse repetition frequencies (PRFs) towards the targets; a receiver for receiving a plurality of threshold hits from prior N−1 CPIs and a plurality of threshold hits from a current CPI; a storage device for storing the plurality of threshold hits from prior N−1 CPIs; and a processor including a set of instructions stored in a memory device. The set of instructions when executed by the processor perform the following processes: converting a plurality of received threshold hits from the prior N−1 CPIs to range unfolded threshold hits; converting a plurality of received threshold hits from the current CPI to range unfolded threshold hits; generating a lookup table of the plurality of range unfolded threshold hits from the prior N−1 CPIs, based on the CPI of each range unfolded threshold hit and a range of each range unfolded threshold hit and storing the lookup table in the storage device; determining the number of the prior N−1 CPIs in which a range unfolded threshold hit from the current CPI has at least one range coincident range unfolded threshold hit from the prior CPI, utilizing the lookup table; generating a range resolved threshold hit when the number of the prior N−1 CPIs in which a range unfolded threshold hit from the current CPI has at least one range coincident range unfolded threshold hit from the prior CPI is greater than or equal to M−1; repeating said determining the number of the prior N−1 CPIs and said generating a range resolved threshold hit for each of the plurality of range unfolded threshold hits from the current CPI; accumulating a plurality of range resolved threshold hits over one or more CPIs in the storage device; and determining the range to the targets, using the accumulated plurality of range resolved threshold hits over said one or more CPIs.

In some embodiments, the lookup table includes a table with a CPI dimension and a range dimension to allow range unfolded threshold hits to be filtered by the CPI and the range. In some embodiments, the lookup table includes a table for each CPI with a range dimension to allow range unfolded threshold hits to be filtered by CPI and range. In some embodiments, the lookup table further includes a range rate dimension to allow range unfolded threshold hits to be filtered by CPI, range, and range rate. In some embodiments, the lookup table is an associative array with associating keys on the dimensions of the table to values that are collections of potential range coincident range unfolded threshold hits, and wherein key/value pairs are stored in the associative array.

In some embodiments, the range bin of the range unfolded threshold hits from the prior CPIs is extrapolated to the time of the current CPI based on the range rate of the range unfolded threshold hit and the time elapsed between the prior CPI and the current CPI.

BRIEF DESCRIPTION OF THE DRAWINGS

These and other features, aspects, and advantages of the disclosed invention will become better understood with regard to the following description, appended claims, and accompanying drawings.

FIG. 1A depicts threshold hits for a threshold processed radar return in a medium or high PRF radar mode with three targets.

FIG. 2A illustrates exemplary CPI lookup tables, according to some embodiments of the disclosed invention.

FIG. 2B shows an exemplary memory layout of a lookup table, according to some embodiments of the disclosed invention.

DETAILED DESCRIPTION

In some embodiments, the disclosed invention generates and utilizes a multidimensional lookup table that maps prior CPI and range bin information to lists of range unfolded threshold hits to reduce the computation in an M-of-N range resolver.

Instead of searching exhaustively through the range unfolded threshold hits from the prior CPIs for each range unfolded threshold hit from the current CPI, it is desired to do some preprocessing on the range unfolded threshold hits from the prior CPIs such that the number of range unfolded threshold hits from the prior CPIs to be evaluated for each range unfolded threshold hits from the current CPI is minimized. If the maximum number of range unfolded threshold hits from the prior CPIs to be evaluated is tightly bound, then in the worst case scenario the computation will scale linearly with the number of threshold hits instead of quadratically.

Figure 1B:
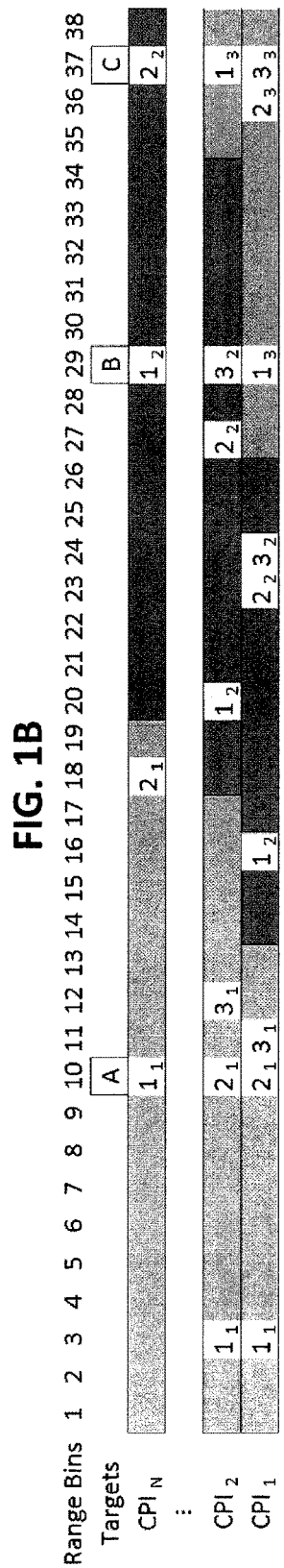
FIG. 1B shows range unfolded threshold hits in a medium or high PRF radar mode with three targets.
Figure 1C:
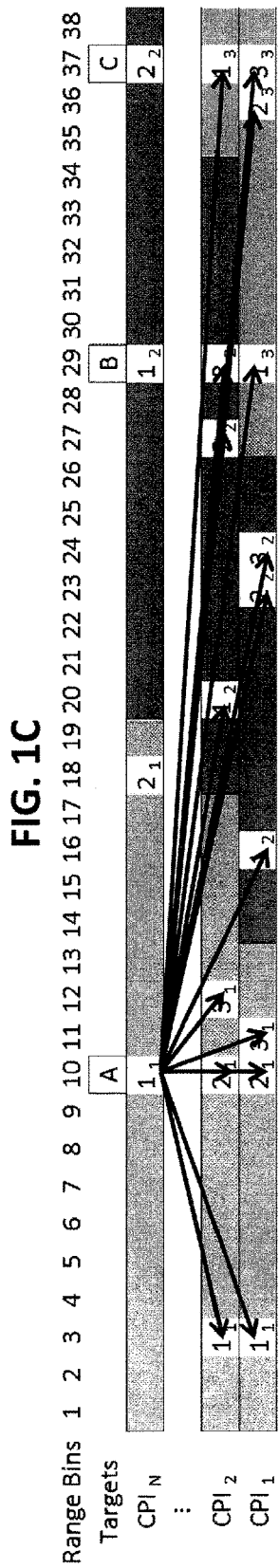
FIG. 1C illustrates an exhaustive state space search for range unfolded threshold hits from the prior N−1 CPIs which are range coincident with one of the range unfolded threshold hits from $CPI_N$.
Figure 1D:
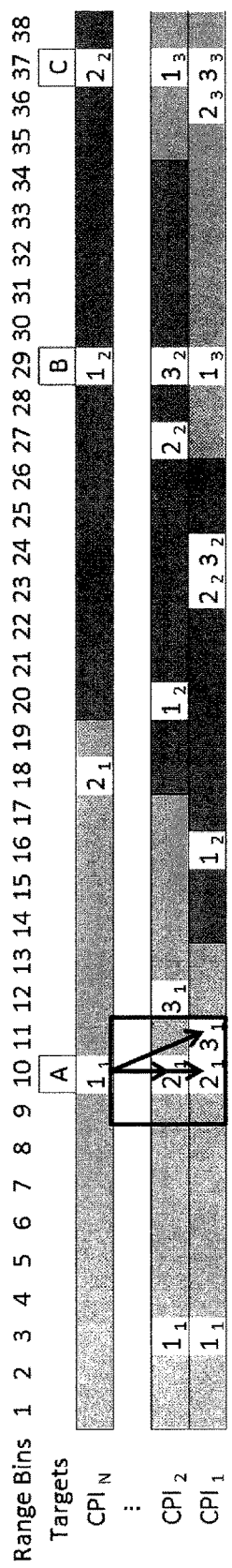
FIG. 1D depicts an optimized state space search, according to some embodiments of the disclosed invention.
Figure 1E:
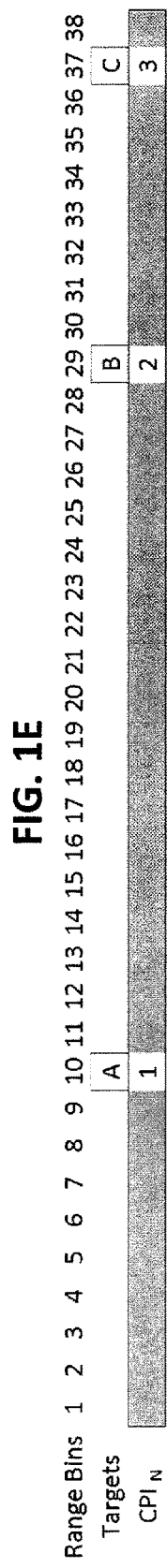
FIG. 1E depicts the range resolved threshold hits output from an M-of-N resolver.

FIG. 1D depicts the usage of such an approach where only the range unfolded threshold hits from the prior CPIs within 1 range bin are evaluated. This reduces the state space from the full set of range unfolded threshold hits from the prior CPIs to only those within the red box. In the worst case 3 range unfolded threshold hits per prior CPI are evaluated for each range unfolded threshold hit from the current CPI. Assuming this worst case is met, when the number of range unfolded threshold hits per CPI is doubled the amount of computation per range unfolded threshold hit from the current CPI remains constant while the number of range unfolded threshold hits from the current CPI is doubled.

As a result, the total computation is doubled instead of quadrupled. In other words, the computation now scales linearly with the number of threshold hits instead of quadratically. In practice such an approach will scale worse than linearly since only the worst case is bound linearly, but the scaling may be very close to linear. FIG. 1D can be contrasted with FIG. 1C to visualize the reduction in computation. A more realistic real world example may have many more range bins and potentially hundreds or thousands of range unfolded threshold hits per CPI.

FIG. 2A notionally illustrates an exemplary lookup table according to some embodiments of the disclosed invention. This lookup table encodes the information (for example that from FIG. 1B) using a 1 range bin tolerance (as depicted in FIG. 1D) in a format in which it can readily be used to filter the range unfolded hits from the prior CPIs to be evaluated for each range unfolded threshold hit from the current CPI. The lookup table has two dimensions. As presented here, the columns are the prior N−1 CPIs and the rows are the range bins. Each cell contains a list of the range unfolded threshold hits using the notation of FIG. 1B or the word "none" to indicate an empty list. For example, in FIG. 1B, there is one range unfolded threshold hit from $CPI_2$ within 1 range bin of range bin 10: $2_1$. This can also be observed from FIG. 2A by finding that the linked list for $CPI_2$ and range bin 10 is $2_1$. Similarly, from both FIG. 1B and FIG. 2A, the range unfolded threshold hits from $CPI_1$ within 1 range bin of range bin 10 can be found to be $2_1$ and $3_1$.

Figure 2B:
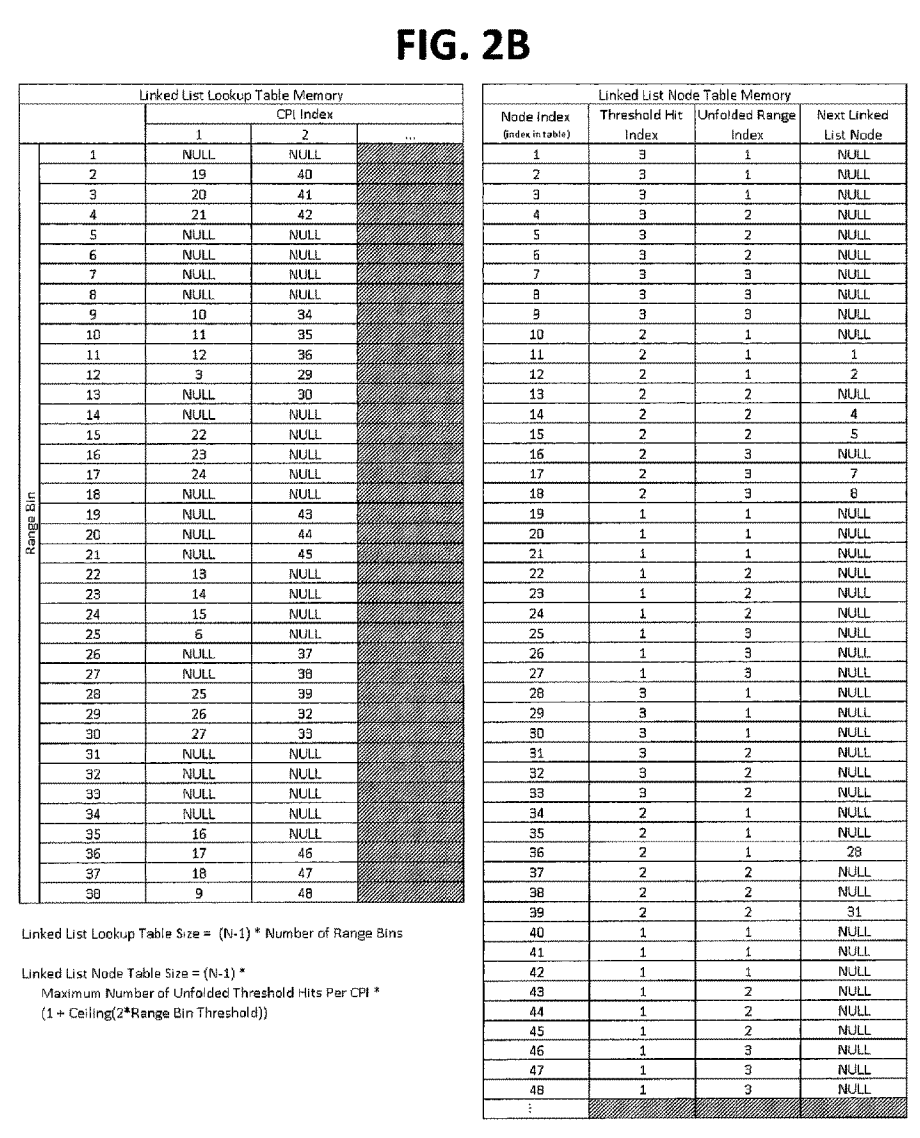

FIG. 2B depicts an exemplary lookup table which can be stored in the memory of a radar system, according to some embodiments of the disclosed invention. As shown two different segments of memory are used. One memory segment, labeled in the figure as the "linked list node table memory", stores the lists of range unfolded threshold hits. The list is stored as a linked list, which is a data structure where each node in the list contains a link to the next node. If there is no next node, a NULL value for next node is used to indicate there are no additional nodes in the list. It is a one-dimensional table of linked list nodes. Each linked list node includes the threshold hit index and unfolded range index to identify a specific range unfolded threshold hit from a given CPI. It also includes the index of the next node in the linked list. A NULL value for the index of the next node indicates the end of the linked list.

The other memory segment, labeled "linked list lookup table memory", associates a prior CPI and range bin to a linked list. It is a two-dimensional table where the CPI index and range bin are the two dimensions of the table. The value stored in each cell is the index of the start of the linked list in the node table. A NULL value indicates an empty linked list. For example, looking up $CPI_2$ and range bin 10 from the lookup table yields the linked list starting at index 35 in the node table. Similarly, looking up index 35 in the node table yields a threshold hit index of 2, an unfolded range index 1, and a next node index of NULL. This is equivalent to the linked list $2_1$ from FIG. 2A. Looking up $CPI_1$ and range bin 10 from the lookup table yields the linked list starting at index 11 in the node table. Likewise, looking up index 11 in the node table yields a threshold hit index of 2, an unfolded range index 1, and a next node index of 1, Looking up index 1 in the node table yields a threshold hit index of 3, an unfolded range index 1, and a next node index of NULL. This is equivalent to the list "$2_1$, $3_1$" from FIG. 2A. A lookup table as used herein is any data structure in which the data is organized and indexed, such as a dimension, a key, a reference, an address, and the like.

In some embodiments, the lookup table is an associative array with associating keys on the dimensions of the table to values that are collections of potential range coincident range unfolded threshold hits, and wherein key/value pairs are stored in the associative array. An associative array is a class of data structures with key/value pairs where the set of keys are unique and can be used to access the values. Multidimensional associative arrays can be accomplished by nesting associative arrays, such that the values contained in the top level associative arrays are other associative arrays and multiple keys are required to drill down to a root value.

The keys used here are on the CPI and range bin, or the rows and columns from FIG. 2A, and the values are the linked lists, or the cells in FIG. 2A. A linked list is a collection and could be replaced with any other collection. A collection is a generic class of data structures which contain data items. The data items used here are the range unfolded threshold hits. Additional dimensions could be added to the associative array if other factors were used to filter the range unfolded threshold hits.

In some embodiments, the lookup table includes a table with a CPI dimension and a range dimension to allow range unfolded threshold hits to be filtered by the CPI and the range. In some embodiments, the lookup table includes a table for each CPI with a range dimension to allow range unfolded threshold hits to be filtered by CPI and range. In some embodiments, the lookup table further includes a range rate dimension to allow range unfolded threshold hits to be filtered by CPI, range, and range rate.

Figure 3:
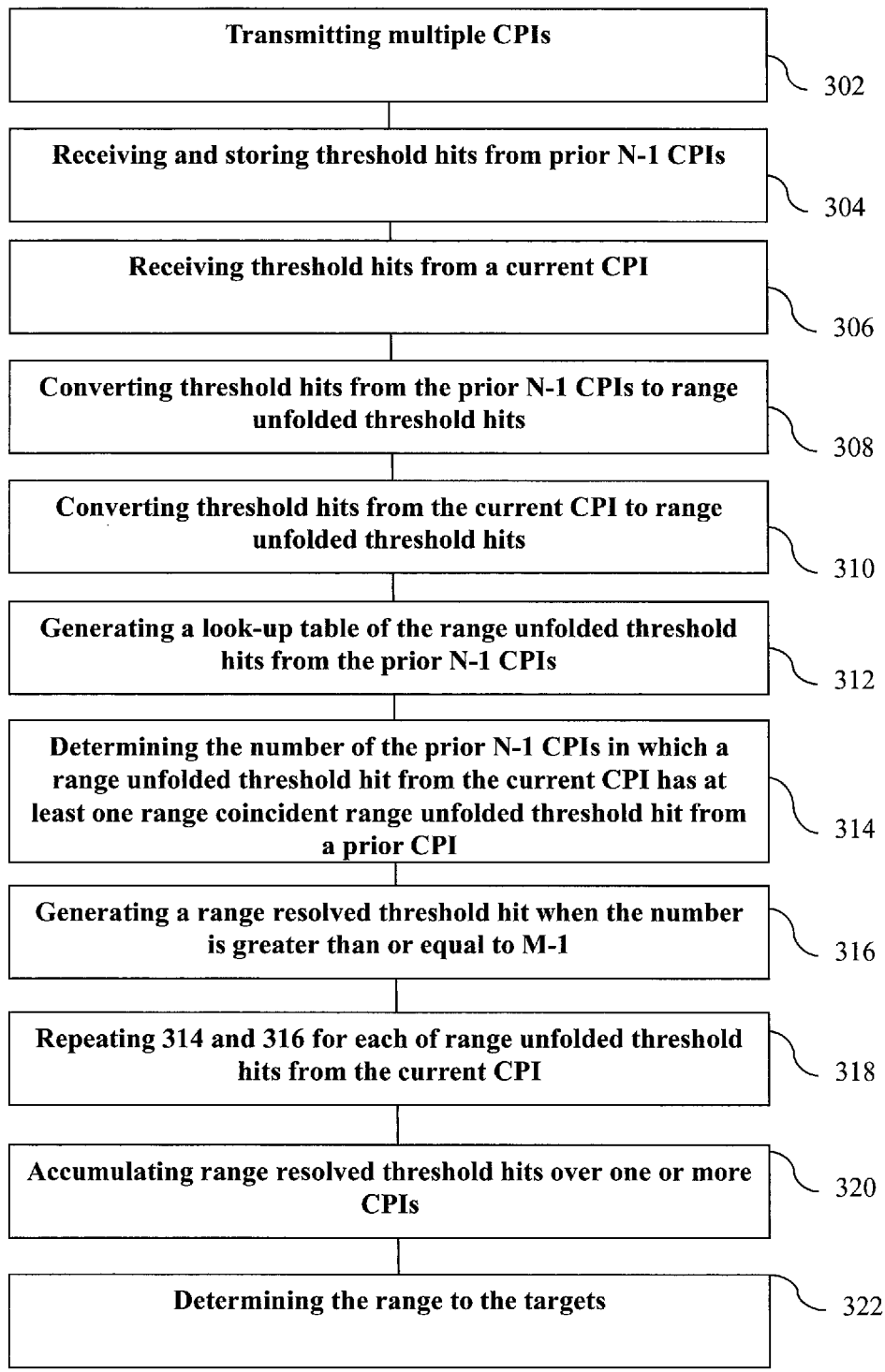
FIG. 3 is a process flow for an M-of-N resolver, according to some embodiments of the disclosed invention.

FIG. 3 is a process flow for an M-of-N resolver, according to some embodiments of the disclosed invention. The process flow is executed by one or more processors, for example, the processor(s) 616 and the associated hardware in FIG. 6. As shown in block 302, multiple coherent processing interval (CPI) signals with different pulse repetition frequencies (PRFs) are transmitted by a radar system towards several targets. In block 304, a plurality of threshold hits from prior N−1 CPIs (N is an integer greater than 1) are received and stored in a memory device. Similarly, in block 306, a plurality of threshold hits from a current CPI (i.e., the most recent CPI transmitted towards the targets) are received. As described above, a threshold hit is declared when a condition within the received data, such as a desired magnitude point above a predefined noise level, is met. Each CPI hit that the M-of-N range resolver receives as input includes a new set of threshold hits for the current CPI, such as those depicted for $CPI_N$ in FIG. 1A. The resolver also maintains the threshold hits for each of the prior N−1 CPIs in a memory device, such as those depicted for $CPI_2$ and $CPI_1$ in FIG. 1A.

The received threshold hits from the prior N−1 CPIs and from the current CPI are converted to range unfolded threshold hits, in block 308 and 310, respectively. This is similar to the process of transitioning from the threshold hits of FIG. 1A to the range unfolded threshold hits of FIG. 1B. In a mid to high PRF radar mode where the true range to the target is ambiguous, the threshold hit is range unfolded to create a number of range unfolded threshold hits with the different potential ranges of the target. The non-range attributes of the originating threshold hit are preserved.

In block 312, a lookup table of the plurality of range unfolded threshold hits from the prior N−1 CPIs is generated, based on the CPI of each range unfolded threshold hit and a range of each range unfolded threshold hit. This is a process to transition, for example, from FIG. 1B to FIG. 2A. Each range unfolded threshold hit has one and only one associated range. In some embodiments, the lookup table is a multidimensional lookup table of linked lists of range unfolded threshold hits for the prior CPIs minimally based on the CPI and the range. This allows an efficient retrieval of a linked list of range unfolded threshold hits from a given prior CPI, where the contents of the link list are the range unfolded threshold hits from the prior CPI which may be range coincident with a range unfolded threshold hit from the current CPI based on its unfolded range (within some tolerance).

In block 314, the number of the prior N−1 CPIs in which a range unfolded threshold hit from the current CPI has at least one range coincident range unfolded threshold hit from a prior CPI is determined, utilizing the lookup table. To answer for the prior N−1 CPIs, which could be denoted as CPIs 1, 2, . . . , N−1, each of those prior CPIs needs to be checked against the current CPI (N), and a summation of the number of the prior CPIs in which at least one range coincident range unfolded threshold hit was found is created. When determining for (first) CPI 1 only the range unfolded threshold hits from CPI 1 are considered. When determining for (second) CPI 2, only the range unfolded threshold hits from CPI 2 are considered. Likewise, when determining for CPI N−1, only the range unfolded threshold hits from CPI N−1 are considered.

A range resolved threshold hit is generated when the number of the prior N−1 CPIs in which a range unfolded threshold hit from the current CPI has at least one range coincident range unfolded threshold hit from the prior CPIs is greater than or equal to M−1, in block 316. A range unfolded threshold hit is the output of the M-of-N resolver indicating a true range to a target. The range resolved threshold hit is generated from at least M different range unfolded threshold hits and any non-range attributes must be somehow fused from those range unfolded threshold hits. Range coincidence may not be the only factor in generating a range resolved threshold hit. That is, the core CRT-based M-of-N resolver operates on the range unfolded threshold hits of, for example, FIG. 1B or FIG. 2A and generates the range resolved threshold hits of FIG. 1E using the lookup table to filter the set of range unfolded threshold hits from the prior CPIs evaluated for each range unfolded threshold hit from the current CPI.

For example, when the range bin tolerance is greater than 0, then each range unfolded threshold hit from the prior CPI may be included in multiple linked lists. One skilled in the art would understand that in generating lookup table, the linked list could alternately be generated to include only the range unfolded threshold hits present within the range bin. The choice of approach may be a tradeoff of computation versus memory usage. Additional dimensions could also be added to the lookup table, such as the range rate bin, to further filter range unfolded threshold hits at the expense of memory usage.

In some embodiments, the range bin of the range unfolded threshold hits from the prior CPIs is extrapolated to the time of the current CPI based on the range rate of the range unfolded threshold hit and the time elapsed between the prior CPI and the current CPI.

In block 318, the processes in blocks 314 and 316 are repeated for each of the plurality of range unfolded threshold hits from the current CPI to accumulate a plurality of range resolved threshold hits over one or more CPIs (block 320). In block 322, the range to the targets is determined, using the accumulated plurality of range resolved threshold hits over said one or more CPIs. In other words, the range resolved threshold hits are the output of the resolver, which are generated using the lookup table to filter the set of range unfolded threshold hits from the prior CPIs evaluated for each range unfolded threshold hit from the current CPI. These range resolved threshold hits are used to accurately determine the range to the targets or the velocity of the targets in the M-of-N range resolver of the disclosed invention.

The range and/or velocity of the targets may be used to identify the targets, for example whether they are friendly or hostile targets; to navigate a vehicle or an aircraft toward or around the targets; to direct a camera, sensor or weapon towards the targets, and the like. This allows the M-of-N range resolver of the disclosed invention to operate effectively in dense target environments with much less computational complexity.

In the conventional approach for operating on the range unfolded threshold hits, each range unfolded threshold hit from the current CPI is evaluated against all of the range unfolded threshold hits from prior N−1 CPIs, as depicted in FIG. 1C. The improved approach of the disclosed invention utilizes the lookup table generated in step 308 and depicted in FIG. 2 to evaluate each range unfolded threshold hit from the current CPI against all of the range unfolded threshold hits from the prior CPIs in the linked lists fetched from the lookup table. This new approach yields the reduction in range unfolded threshold hits from the prior CPIs depicted in FIG. 1D.

Figure 4:
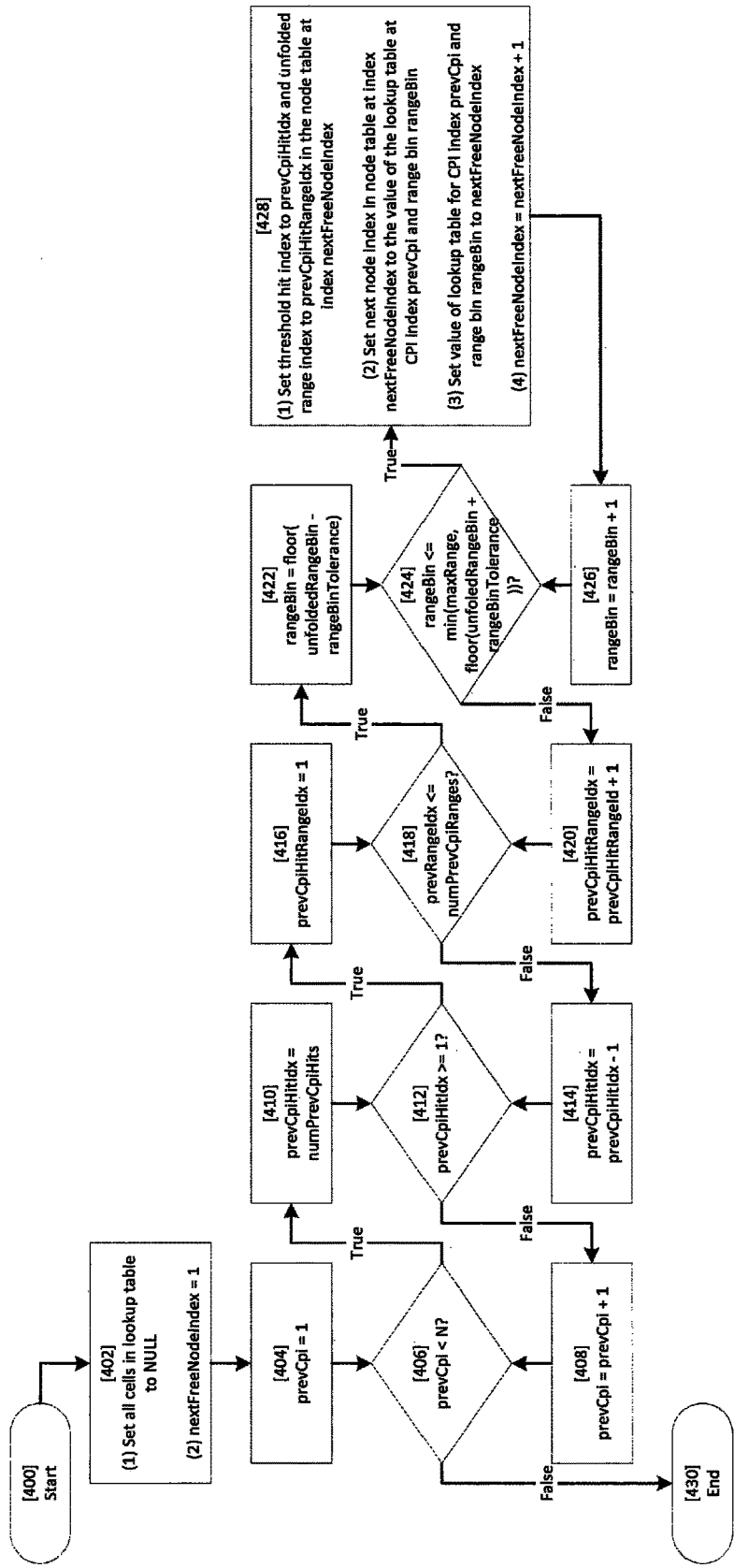
FIG. 4 is a more detailed process flow for generating a lookup table, according to some embodiments of the disclosed invention.

FIG. 4 is an example of a process flow for generating a lookup table, according to some embodiments of the disclosed invention. Block 402 essentially clears the contents of the lookup table for the new CPI. Blocks 404, 406, and 408 constitute a loop over the N−1 prior CPIs. Within this loop, blocks 410, 412, and 414 constitute a loop over each of the threshold hits from a given prior CPI. Within this loop, blocks 416, 418, and 420 constitute a loop over each range unfolded threshold hit from a given threshold hit. Together, blocks 404 through 420 serve to loop over all the range unfolded threshold hits from the prior N−1 CPIs. Within this loop, blocks 422, 424, and 426 constitute a loop over each of the range bins within the range bin tolerance for a given range unfolded threshold hit. Within this loop, block 428 adds a linked list node into the linked list node table for the range unfolded threshold hit and adds it to the start of the linked list for the given CPI and range bin.

Some examples of linked lists nodes are depicted in FIG. 2B, where each row in the table labeled "linked list node table memory" is a linked list node. The index of the linked list node at the start of the linked list for a given CPI and range bin is stored in the table labels "linked list lookup table memory". For example, looking up $CPI_2$ and range bin 10 from the lookup table yields the linked list starting at index 35 in the node table. Similarly, looking up index 35 in the node table yields a threshold hit index of 2, an unfolded range index 1, and a next node index of NULL. This is equivalent to the linked list $2_1$ from FIG. 2A. Looking up $CPI_1$ and range bin 10 from the lookup table yields the linked list starting at index 11 in the node table. Likewise, looking up index 11 in the node table yields a threshold hit index of 2, an unfolded range index 1, and a next node index of 1. Similarly, looking up index 1 in the node table yields a threshold hit index of 3, an unfolded range index 1, and a next node index of NULL. This is equivalent to the list "$2_1$, $3_1$" from FIG. 2A. The flow depicted here generates the memory layout of a lookup table as depicted in FIG. 2B given the range unfolded threshold hits in FIG. 1B as input.

Figure 5:
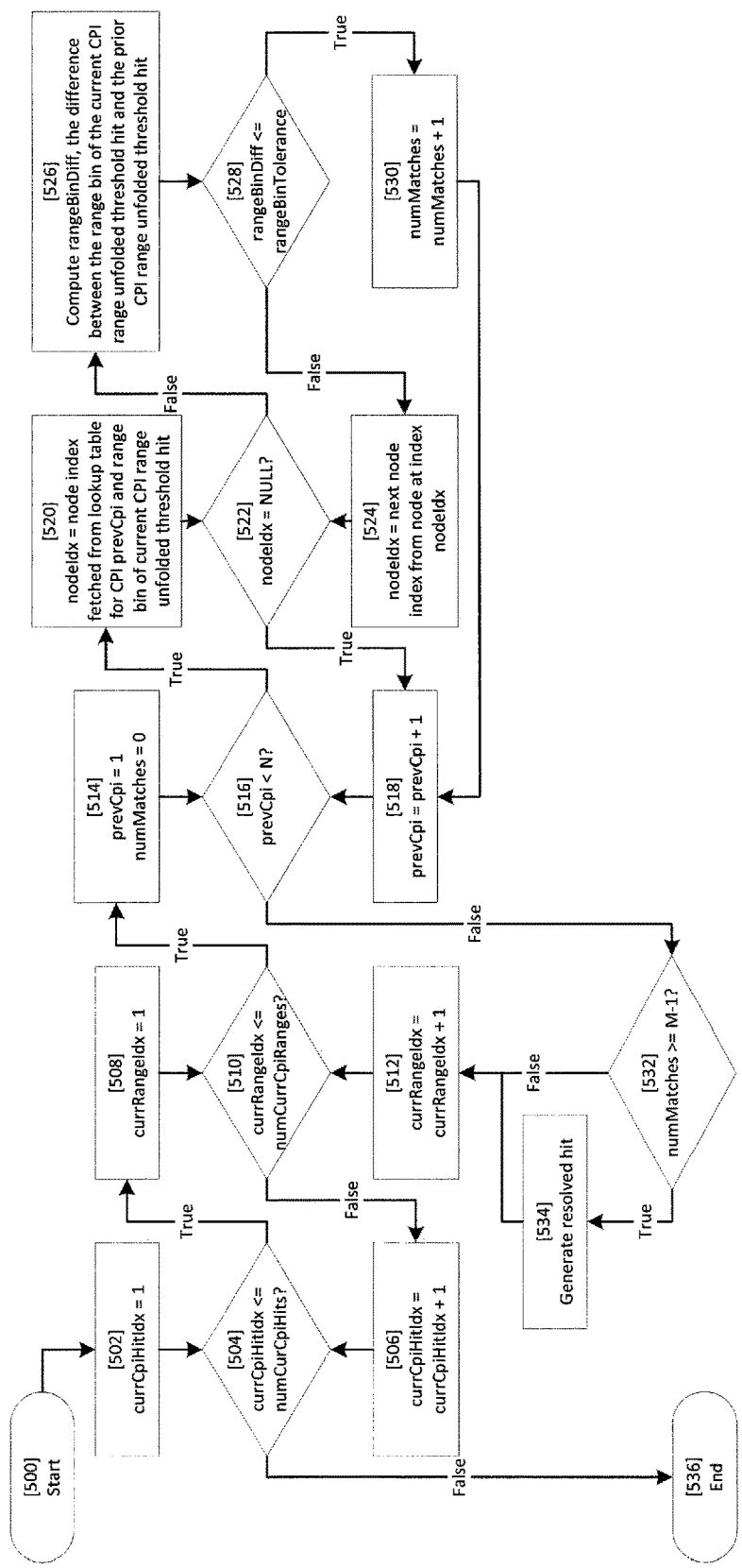
FIG. 5 is a more detailed process flow for generating resolver hits using a lookup table, according to some embodiments of the disclosed invention.

FIG. 5. is an example of a more detailed process flow for generating rage resolved hits, according to some embodiments of the disclosed invention. Blocks 502, 504, and 506 constitute a loop over the current CPI threshold hits. Within this loop, blocks 508, 510, and 512 constitute a loop over each range unfolded threshold hit from a given threshold hit. Together blocks 502 through 512 serve to loop over each range unfolded threshold hit from the current CPI. Within this loop, blocks 514, 516, and 518 constitute a loop over the N−1 prior CPIs. Within this loop, blocks 520, 522, and 524 constitute a loop over the linked list fetched from the lookup table for a given prior CPI and the range bin of the range unfolded threshold hit from the current CPI. Blocks 502 through 524 together constitute a loop whereby every range unfolded threshold hit from the current CPI can be compared to the potentially range coincident range unfolded threshold hits from the prior N−1 CPIs.

Within that loop, block 526 determines the difference between the range bin of the range unfolded threshold hit from the current CPI and a potentially range coincident range unfolded threshold hit from one of the prior N−1 CPIs. Block 528 checks if the range bin difference is within the threshold to see if the current and range unfolded threshold hits from the prior CPIs are sufficiently close to be considered range coincident. If they are not range coincident, the loop over the linked list, blocks 520 through 524, continues. If they are range coincident, then in block 530 the number of matches, initially set to 0 for this range unfolded threshold hit from the current CPI in block 514, is incremented. Subsequently, the loop over the linked list is exited.

Overall, blocks 514 through 530 determine the number of the N−1 prior CPIs in which there is at least one range unfolded threshold hit which is range coincident with the current range unfolded threshold hit. Block 532 checks if the number of matches is M−1 or greater. If so, then in at least M of N successive CPIs, a range unfolded threshold hit was found at approximately the same range. In this case, a range resolved threshold hit is generated in block 534. Using a lookup table (for example, one similar to the one depicted in FIG. 2B) as input, the process flow generates range resolved threshold hits, for example, similar to those shown in FIG. 1E. Here, the linked lists referenced from the lookup table include each range unfolded threshold hit from the prior CPI which may be range coincident with a range unfolded threshold hit from the current CPI at that range bin.

In some embodiments, if the linked list node table memory is partitioned per prior CPI then the lookup table generation process can be performed independently for each of the prior CPIs. This allows the lookup table to be generated as if there were N−1 independent range bin lookup tables, which can be generated concurrently. The single lookup table could be replaced with a separate lookup table for each of the N−1 prior CPIs where the CPI was removed as one of the dimensions in the lookup table. Similarly, in some embodiments, the processing of each of the range unfolded threshold hits from the current CPI can be processed independently and can occur concurrently.

Figure 6:
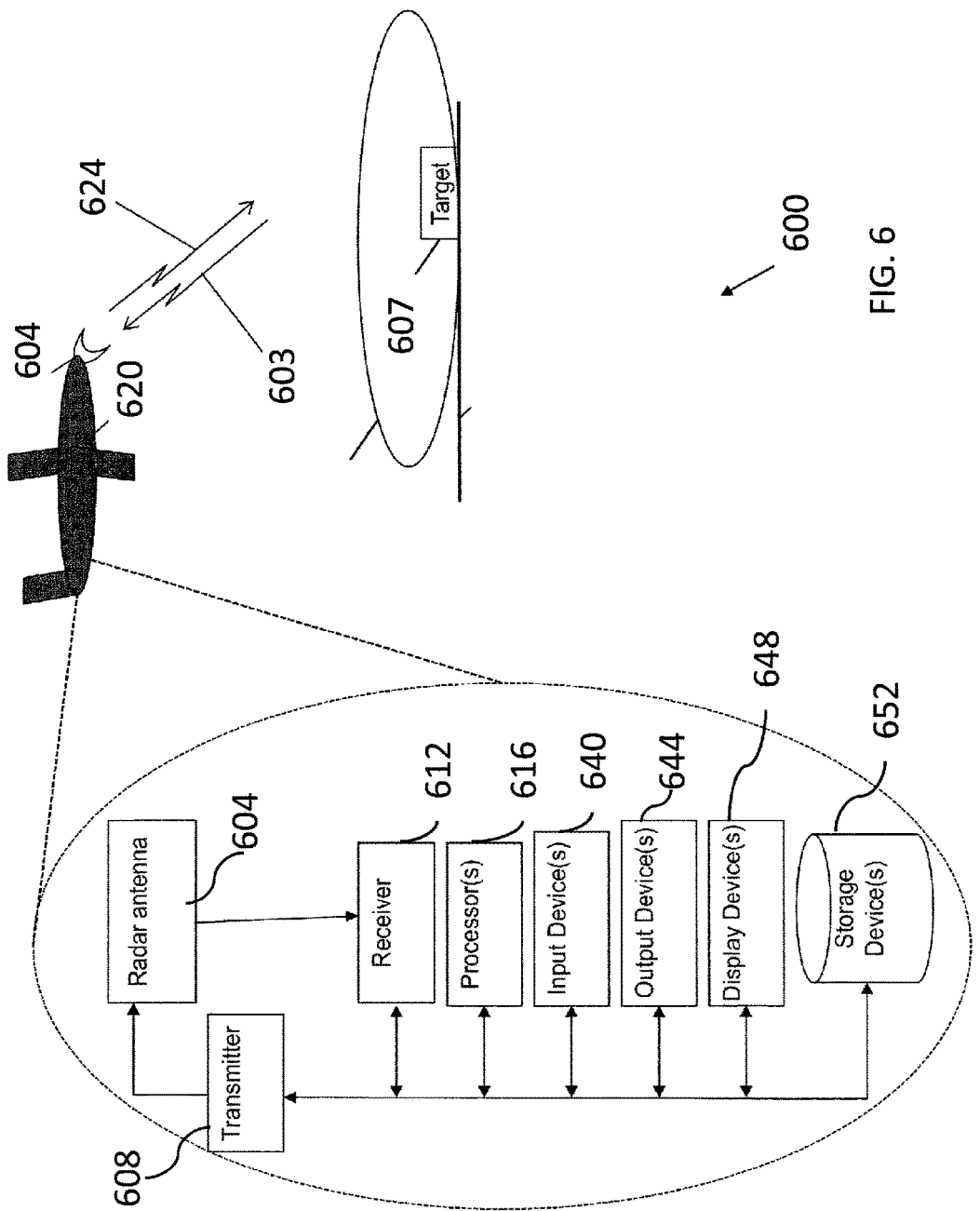
FIG. 6 is a system block diagram of an exemplary pulse-Doppler radar target detection system, according to some embodiments of the disclosed invention.

FIG. 6 is a system block diagram of an exemplary pulse-Doppler radar target detection system 600, according to some embodiments of the disclosed invention. As shown, a radar platform, such as an aircraft 620 has a radar antenna 604 and includes a transmitter 608 and receiver 612. The transmitter 608 commands the antenna 604 to transmit radar transmission pulses (CPI) 624 towards one or more targets 607 within a region of interest. The radar transmission pulses are arbitrary pulses and can be disjoint radio frequency bands where the bands do not overlap, or the radar transmission frequencies can partially overlap each other. Radar return pulses (samples) 603 are generated in response to the radar transmission pulses reflecting off of a plurality of objects (targets) within the region of interest. In some embodiments, the echo from each target (as seen at the receiver) is a version of the transmitted signal that is 1) time delayed by twice the transit time from transmitter to target to receiver, 2) frequency shifted due to target motion, and 3) attenuated by some factor. The receiver observes a return signal consisting of each of the target echoes (plus random noise).

System 600 also includes one or more input devices 640, one or more output devices 644, one or more display devices 648, one or more processors 616, and one or more storage devices 652. The modules and devices described herein can, for example, utilize the one or more processors 616 to execute computer executable instructions and/or the modules and devices described herein can, for example, include their own processor to execute computer executable instructions. As known in the art, the one or more processors 616 include their own memories, such as RAMs and ROMs to store and execute program instructions. One skilled in the art would understand that the system 600 can include, for example, other modules, devices, and/or processors known in the art and/or varieties of the described modules, devices, analog-to digital converters (ADCs), digital-to-analog converters (DACs), and/or processors.

The input devices 640 receive information from a user (not shown) and/or another computing system (not shown). The input devices 640 can include, for example, a keyboard, a scanner, a microphone, a stylus, a touch sensitive pad or display. The output devices 644 output information associated with the system 600 (e.g., information to a printer, information to a speaker, information to a display, for example, graphical representations of information). The processors 616 execute instructions for the system (e.g., applications). The storage devices 652 store a variety of information/data, including radar imaging data generated by the system 600 and prior CPIs. The display devices 648 display information associated with the system 600, for example, target information including their position, distance, type and the like, status information, configuration information and the like. The storage devices 652 can include, for example, long-term storage, such as a hard drive, a tape storage device, or flash memory; short-term storage, such as a random access memory, or a graphics memory; and/or any other type of computer readable storage. In some embodiments, the process according to the disclosed invention is performed by the processor(s) 616 utilizing some or all of the components illustrated in FIG. 6.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method, executed by a radar system, for determining range to targets using an M-of-N range resolver, the method comprising:
   a) transmitting multiple coherent processing interval (CPI) signals with different pulse repetition frequencies (PRFs) towards the targets;
   b) receiving and storing a plurality of threshold hits from prior N−1 CPIs, where N is an integer greater than 1;
   c) receiving a plurality of current threshold hits from a current CPI;
   d) converting the plurality of received threshold hits from the prior N−1 CPIs to range unfolded threshold hits;
   e) converting the plurality of received current threshold hits from the current CPI to range unfolded threshold hits;
   f) generating a lookup table of the plurality of range unfolded threshold hits that are within one range bin tolerance of each other from the prior N−1 CPIs, based on the CPI of each range unfolded threshold hit and a range of each range unfolded threshold hit of the prior N−1 CPIs, wherein each cell of the lookup table contains a list of the range unfolded threshold hits from each of the prior N−1 CPIs that are within one range bin tolerance of each other;
   g) determining the number of the prior N−1 CPIs in which a range unfolded threshold hit from the current CPI has at least one range coincident range unfolded threshold hit from the prior CPI, utilizing the lookup table;
   h) generating a range resolved threshold hit when the number of the prior N−1 CPIs in which a range unfolded threshold hit from the current CPI has the at least one range coincident range unfolded threshold hit from the prior CPI determined in step g is greater than or equal to M−1, where M is an integer greater than 1;
   i) repeating steps g and h for each of the plurality of range unfolded threshold hits from the current GPI;
   j) accumulating a plurality of range resolved threshold hits over one or more CPIs; and
   k) determining the range to the targets, using the accumulated plurality of range resolved threshold hits over said one or more CPIs.

2. The method of claim 1, wherein the lookup table includes a table with a CPI dimension and a range dimension to allow range unfolded threshold hits to be filtered by the CPI and the range.

3. The method of claim 1, wherein the lookup table includes a table for each CPI with a range dimension to allow range unfolded threshold hits to be filtered by CPI and range.

4. The method of claim 1, wherein the lookup table further includes a range rate dimension to allow range unfolded threshold hits to be filtered by CPI, range, and range rate.

5. The method of claim 1, wherein the lookup table is an associative array with keys on the dimensions of the table to values that are collections of potential range coincident range unfolded threshold hits, and wherein key/value pairs are stored in the associative array.

6. The method of claim 1, wherein a range unfolded threshold hit from a prior CPI is stored in multiple range bins or a single range bin in the lookup table.

7. The method of claim 1, wherein a range bin of the range unfolded threshold hits from the prior CPIs is extrapolated to the time of the current CPI based on the range rate of the range unfolded threshold hit and the time elapsed between the prior CPI and the current CPI.

8. A radar target detection system including an M-of-N range resolver comprising:
   a transmitter for transmitting multiple coherent processing interval (CPI) signals with different pulse repetition frequencies (PRFs) towards the targets;
   a receiver for receiving a plurality of threshold hits from prior N−1 CPIs and a plurality of current threshold hits from a current CPI, where N is an integer greater than 1;
   a storage device for storing the plurality of threshold hits from prior N−1 CPIs; and
   a processor including a set of instructions stored in a memory device, the set of instructions when executed by the processor performing the following processes:
   a) converting the plurality of received threshold hits from the prior N−1 CPIs to range unfolded threshold hits;
   b) converting the plurality of received current threshold hits from the current CPI to range unfolded threshold hits;
   c) generating a lookup table of the plurality of range unfolded threshold hits that are within one range bin tolerance of each other from the prior N−1 CPIs, based on the CPI of each range unfolded threshold hit and a range of each range unfolded threshold hit of the prior N−1 CPIs and storing the lookup table in the storage device, wherein each cell of the lookup table contains a list of the range unfolded threshold hits from each of the prior N−1 CPIs that are within one range bin tolerance of each other;

d) determining the number of the prior N−1 CPIs in which a range unfolded threshold hit from the current CPI has at least one range coincident range unfolded threshold hit from the prior CPI, utilizing the lookup table;

e) generating a range resolved threshold hit when the number of the prior N−1 CPIs in which a range unfolded threshold hit from the current CPI has at least one range coincident range unfolded threshold hit from the prior CPI determined in step d is greater than or equal to M−1, where M is an integer greater than 1;

f) repeating steps d and e for each of the plurality of range unfolded threshold hits from the current CPI;

g) accumulating a plurality of range resolved threshold hits over one or more CPIs in the storage device; and h) determining the range to the targets, using the accumulated plurality of range resolved threshold hits over said one or more CPIs.

9. The system of claim 8, wherein the lookup table includes a table with a CPI dimension and a range dimension to allow range unfolded threshold hits to be filtered by the CPI and the range.

10. The system of claim 8, wherein the lookup table includes a table for each CPI with a range dimension to allow range unfolded threshold hits to be filtered by CPI and range.

11. The system of claim 8, wherein the lookup table further includes a range rate dimension to allow range unfolded threshold hits to be filtered by CPI, range, and range rate.

12. The system of claim 8, wherein the lookup table is an associative array with keys on the dimensions of the table to values that are collections of potential range coincident range unfolded threshold hits, and wherein key/value pairs are stored in the associative array.

13. The system of claim 8, wherein a range unfolded threshold hit from a prior CPI is stored in multiple range bins or a single range bin in the lookup table.

14. The system of claim 8, wherein a range bin of the range unfolded threshold hits from the prior CPIs is extrapolated to the time of the current CPI based on the range rate of the range unfolded threshold hit and the time elapsed between the prior CPI and the current CPI.

* * * * *